INVENTORS
Masao Horino
Minoru Takauchi

ATTYS.

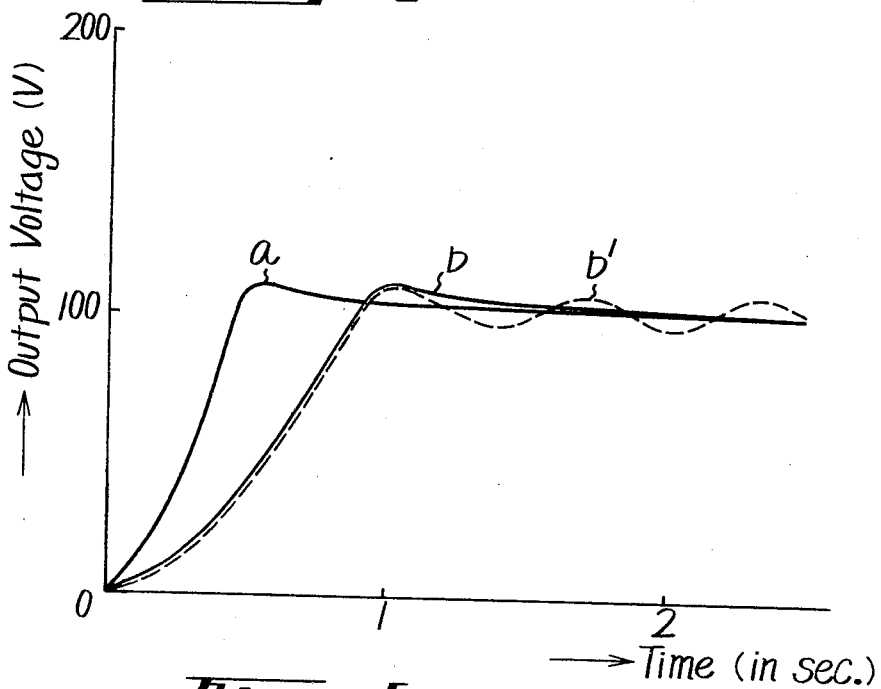
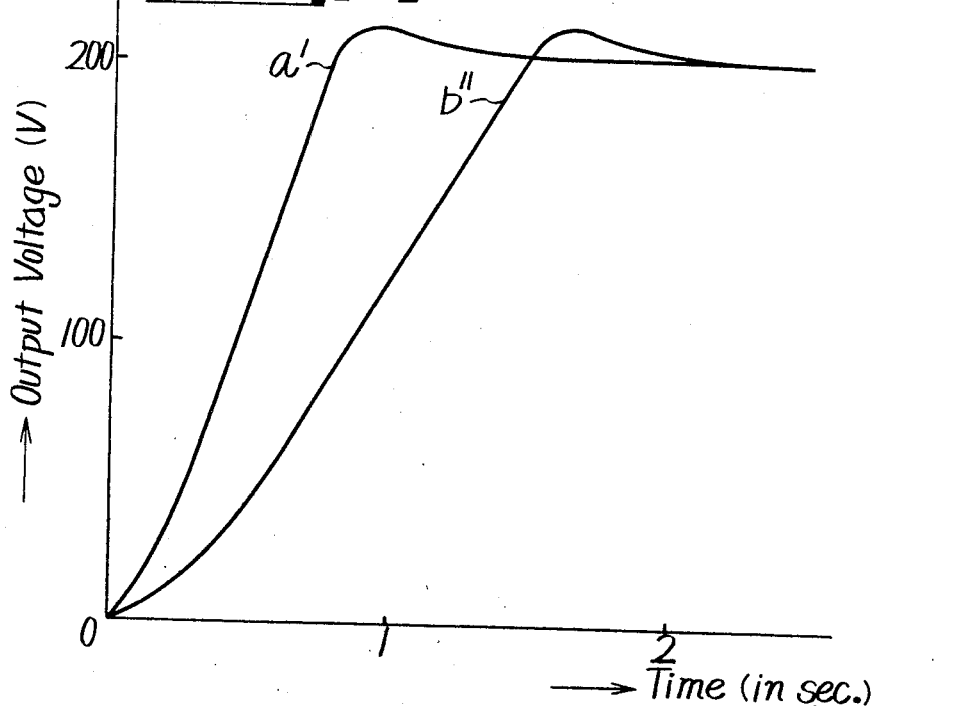

United States Patent Office 3,510,750
Patented May 5, 1970

3,510,750
RECTIFIED OUTPUT VOLTAGE CONTROL
DEVICE
Masao Horino, 2–11 Nakane-2, Meguro-ku, Tokyo, Japan, and Minoru Takauchi, Saitama-ken, Japan; said Takauchi assignor to said Horino
Filed Nov. 28, 1967, Ser. No. 686,015
Int. Cl. H02m 1/08, 7/20
U.S. Cl. 321—18          9 Claims

ABSTRACT OF THE DISCLOSURE

A rectified DC output voltage control device which is adapted to produce a constant rectified output voltage by controlling a gate voltage of a semiconductor controlled rectifier through the use of a photoconductive element actuated by a discharge tube which emits light when the output voltage reaches a predetermined value.

BACKGROUND OF THE INVENTION

Field of the invention

This invention relates to a rectifier device and has more particular reference to a rectified DC output voltage control device which is adapted to produce a substantially constant DC output voltage irrespective of the variations in an AC input voltage.

Description of the prior art

In conventional types of rectifier devices an autotransformer, magnetic saturation type constant-voltage device or the like is employed to produce a substantially constant DC output voltage independently of the variations in an AC input voltage. However, such devices used in the prior art are inconvenient of handling and are incapable of rapid response to the variations in a load in case of manual operation, and in case of automatic operation they are inevitably bulky and heavy.

SUMMARY OF THE INVENTION

The primary object of this invention is to provide a light-weight and small-sized rectified DC output voltage control device suitable for use with, for example, the power source of flash lamps for photography which rapidly responds to the variations in an AC input voltage and a load to produce a certain constant DC voltage in a short time.

Other objects, features and advantages of this invention will become apparent from the following description taken in conjunction with the accompanying drawings.

BRIEF DESCRIPTION OF THE DRAWING

FIG. 4 is a graph showing control characteristics obtained in the example illustrated in FIG. 1; and FIG. 5 is a graph showing control characteristics exhibited in the examples of FIGS. 2 and 3.

DESCRIPTION OF THE PREFERRED EMBODIMENTS

Figure 1:
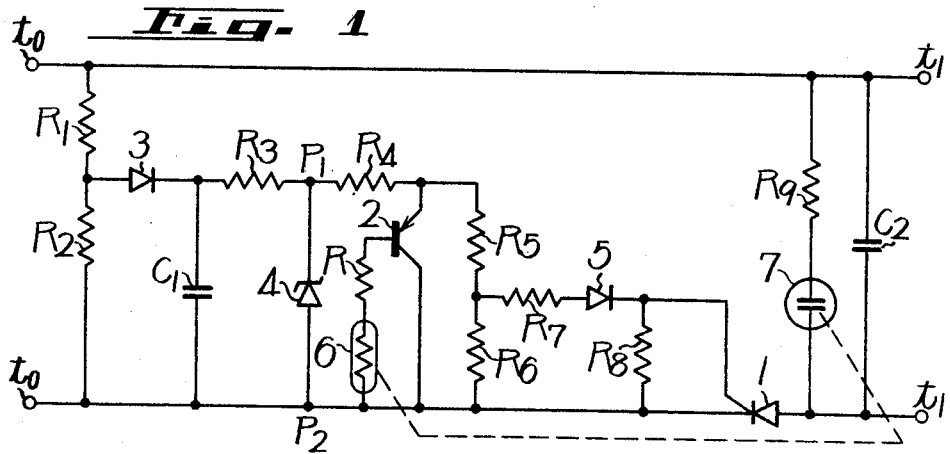
FIG. 1 is a circuit diagram illustrating the rectified output voltage control device of this invention.

In FIG. 1 reference character $t_0$ designates AC input terminals, and $t_1$ DC output terminals. Reference numeral 1 indicates a semiconductor controlled rectifier element such as the so-called SCR, which is incorporated in a main control circuit. In this invention, a transistor 2 is provided for controlling the gate of the semiconductor controlled rectifier element 1, which transistor has connected thereto a photoconductive element 6 for controlling the switching thereof. Further, a low-pressure gas discharge tube 7 such, for example, as a neon tube is inserted between the DC output terminals $t_1$, and the discharge tube 7 is adapted to project its light to the photoconductive element 6 to minimize the variations in the voltage applied across the DC output terminals. A power source circuit for the transistor 2 for controlling the gate of the semiconductor controlled rectifier element 1 may be selected at will, but in the illustrated example a rectified output of a diode 3 connected to the mid point between voltage dividing resistors $R_1$ and $R_2$, which are incorporated between the terminals $t_0$, is smoothed by a capacitor $C_1$ to obtain a DC voltage, and the output side of the diode 3 is connected between the emitter and collector of the transistor 2 through resistors $R_3$ and $R_4$ to feed a DC current to the transistor 2. Reference numeral 4 identifies a Zener diode provided for maintaining constant a voltage appearing between points $P_1$ and $P_2$. Then, the aforementioned photoconductive element 6 is inserted between the base and collector of the transistor 2 through a resistor R. The circuit between the transistor 2 and the semiconductor controlled rectifier element 1 can be constructed as desired, and the mid point between resistors $R_5$ and $R_6$ connected, for example, to the output side of the transistor 2 is connected to the gate of the semiconductor controlled rectifier element 1 through a resistor $R_7$ and a diode 5 for protecting the element 1. Reference character $R_8$ indicates a bias resistor connected in parallel to the output side of the diode 5. The photoconductive element 6 may be CdS, phototransistor or the like. A resistor $R_9$ is connected between the DC output terminals $t_1$ in parallel relation to the discharge tube 7 and serves to control the current passing through the neon tube. Reference character $C_2$ designates a smoothing capacitor.

With such an arrangement as has been described in the foregoing, an AC input voltage is impressed across the input terminals $t_0$ and is rectified by the semiconductor controlled rectifier element 1 incorporated in the main rectifier circuit, to produce a rectified DC output voltage across the output terminals $t_1$. The AC input voltage is divided by the voltage dividing resistors $R_1$ and $R_2$ and is fed to the diode 3, the rectified output of which is made to be of a certain voltage by the Zener diode 4 and is then applied between the emitter and collector of the transistor 2.

Where the DC output voltage applied across the terminals $t_1$ is lower than a value at which the low-pressure gas discharge tube 7 is caused to initiate discharging, the photoconductive element 6 is not irradiated by light, and hence the resistance value of the photoconductive element is on the order of a megohm and the base voltage of the transistor 2 approaches the emitter voltage to hold the transistor 2 in the off state. Accordingly, the terminal voltage of the Zener diode 4 is constant and a constant voltage is always applied between the base and emitter of the transistor 2. While, at the same time a suitable voltage is fed to the gate of the semiconductor controlled rectifier element 1 through the resistor $R_7$ and the diode 5, so that the element 1 is held in the on state and performs the function of rectification to produce a DC output voltage across the terminals $t_1$.

When the DC output voltage across the terminals $t_1$ exceeds the value for initiating discharge of the low-pressure gas discharge tube 7, the discharge tube 7 emits light to irradiate the photoconductive element 6 to lower its internal resistance value, so that the base voltage of the transistor 2 approaches the collector voltage thereof to cause the transistor 2 to conduct. As a result of this, the circuits of the resistors $R_5$ and $R_6$ are shorted by the transistor 2 and consequently the gate voltage of the semiconductor controlled rectifier element 1 is reduced to substantially zero. Under such conditions, when the negative portion of the AC voltage is applied to the anode of the semiconductor controlled rectifier element 1, the element 1 is thereby made non-conductive. Thus, when the voltage across the terminals $t_1$ is reduced lower than a predetermined value, the discharge tube 7 is put off to make the transistor 2 non-conductive, as contrary to the foregoing. This leads to application of a control voltage to the gate of the semiconductor controlled rectifier element 1 to put it in the on state again, thus producing a rectified output. Such operations are repeated to hold the DC output across the terminals $t_1$ at a substantially constant voltage.

Figure 2:
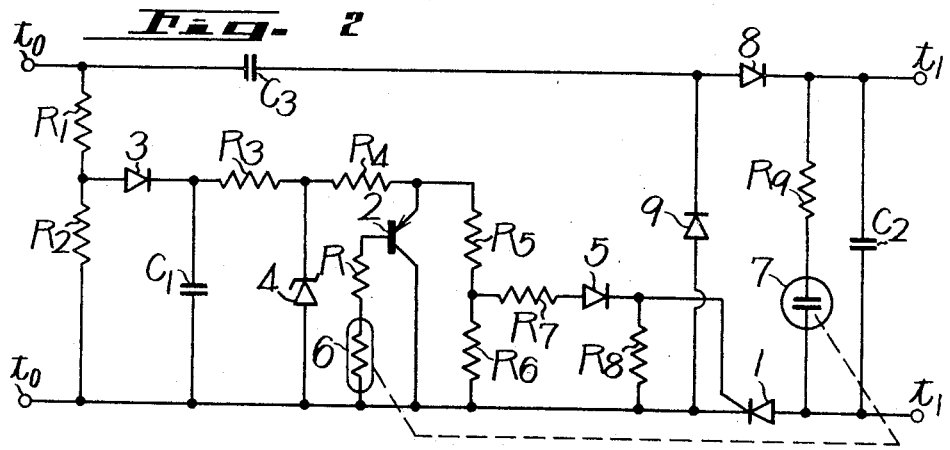
FIGS. 2 and 3 are circuit diagrams illustrating other examples of the device depicted in FIG. 1.

In FIG. 2 there is illustrated a voltage-doubler rectifier, which consists of the circuit of FIG. 1 and diodes 8 and 9 and a capacitor $C_3$ and in which similar elements to those in FIG. 1 are identified by similar reference numerals. In the illustrated example, where the DC output voltage across the output terminals $t_1$ is lower than the value for initiating discharge of the discharge tube 7, the semiconductor controlled rectifier element 1 is in the on state, as in the example of FIG. 1, and hence voltage-doubling rectification is accomplished by the diodes 8 and 9 and the capacitors $C_2$ and $C_3$. Also in this example, when the DC output voltage exceeds the value at which discharge of the discharge tube 7 is initiated, the discharge tube 7 emits light to irradiate the photoconductive element 6. This leads to conducing of the photoconductive element 6 to put the semiconductor controlled rectifier element in the off state, thus holding the DC output voltage across the terminals $t_1$ at a substantially constant value.

Figure 3:
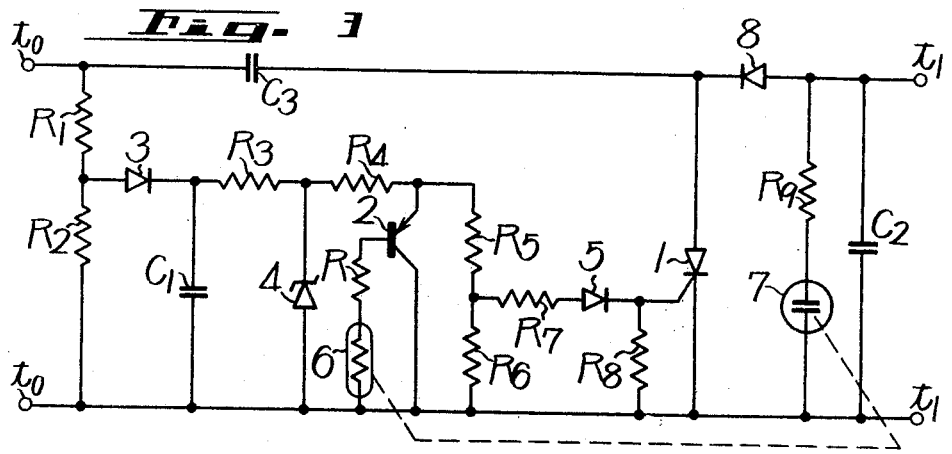

FIG. 3 illustrates a modified form of the voltage-doubler rectifier shown in FIG. 2, in which the semiconductor controlled rectifier element 1 performs the function of the diode 9 and similar elements to those in FIG. 2 are designated by the same reference numerals. In the present example, where the DC output voltage across the terminals $t_1$ is lower than the value for initiating discharge of the discharge tube 7, the semiconductor controlled rectifier element 1 is in the on state as in the example depicted in FIG. 1 and consequently voltage-doubling rectification is carried out by the semiconductor controlled rectifier element 1, the diode 8 and the capacitors $C_2$ and $C_3$. Also in this example, where the DC output voltage exceeds the value for initiating discharge of the discharge tube 7, the discharge tube 7 emits light, as described above, to irradiate the photoconductive element 6. As a result of this, the photoconductive element 6 becomes conductive, while the semiconductor controlled rectifier element 1 becomes non-conductive. Since the AC input voltage across the terminals $t_0$ is fed to the terminals $t_1$ through the capacitor $C_3$ and the diode 8, no voltage-doubling rectification is effected and accordingly the DC output voltage across the terminals $t_1$ in this case is reduced lower than that obtained when voltage-doubling rectification is carried out. In such a case, the discharge tube 7 is put out and the gate voltage to the semiconductor controlled rectifier element 1 is restored to conduct it to start voltage-doubling rectification. Such operations are repeated to maintain the DC output voltage across the terminals $t_1$ at a substantially constant value.

FIG. 4 illustrates control characteristics of the rectified output control device of FIG. 1, obtained with the input AC voltage being changed, the abscissa representing time and the ordinate an output voltage. The curve $a$ shows a characteristic obtained with an AC voltage of 200 v. being impressed across the input terminals $t_0$ without any load, while the curve $b$ shows a characteristic exhibited with an AC voltage of about 100 v. being fed across the input terminals $t_0$. The curve $b'$ was obtained in the case where a varying load such as a flash lamp was connected to the output terminals $t_1$ and it varies up and down relative to the curve $b$ obtained without any load, as illustrated.

FIG. 5 shows control characteristics of the voltage-doubling rectifiers exemplified in FIGS. 2 and 3, in which the curve $a'$ illustrates a characteristic obtained with an AC voltage of 200 v. being impressed to the input terminals $t_0$ and the curve $b''$ shows a characteristic exhibited with an AC voltage of 100 v. or so being impressed to the input terminals $t_0$, no load being connected to the output terminals $t_1$ in the both cases.

As has been described in the foregoing, the rectified DC output voltage control device of this invention is capable of rapidly responding to the variations in the load to restore its output voltage to a certain constant value in a short time. Further, the device of this invention can be miniaturized and reduced in weight and hence is of particular utility when employed in the power source device for a flash lamp of photographic use.

It will be apparent that many modifications and variations may be effected without departing from the scope of the novel concepts of this invention.

We claim as our invention:

1. A rectifier circuit capable of producing a substantially constant DC output voltage comprising a gate controlled rectifier element, first and second input terminals for connection to an AC source, first and second output terminals for supplying rectified current to a load, a low pressure discharge tube operatively connected across the first and second output terminals, a photoelectric cell, switch means for controlling the gate of the rectifier element and including a transistor having a base connected to the first input terminal through said photoelectric cell, the photoelectric cell being arranged to receive illumination from the discharge tube to control the base bias of the transistor, a first DC biasing circuit connected across the first and second input terminals for biasing the emitter of the transistor, said emitter being connected via a second DC biasing circuit to the gate of the rectifier element, the collector of the transistor being connected to the first input terminal, and arrangement being such that the transistor conducts causing the rectifier element to become nonconductive only when the discharge tube discharges due to the potential across the first and second output terminals rising to a predetermined value.

2. A circuit as claimed in claim 1 in which the controlled rectifier element is connected between the first input and output terminals.

3. A circuit as claimed in claim 1 including a first capacitor and a first diode connected in series between the second input and output terminals, the diode and controlled rectifier element being connected in the same direction of polarity with respect to the current for supplying the load, a second capacitor connected across the first and second output terminals, and a second diode connected between the interconnection point of the first capacitor and of the first diode and the first input terminal; the arrangement being such that the circuit operates as a voltage doubler with a substantially constant DC output voltage.

4. A circuit as claimed in claim 1 in which the controlled rectifier element is connected in parallel with the first and second input terminals, a capacitor, the rectifier element being connected to the second input terminal via said capacitor, a diode being connected in series with the capacitor and the second output terminal for supplying rectified current to the load, and a second capacitor connected across the first and second output terminals, the arrangement being such that the circuit operates as a voltage doubler with a substantially constant DC output voltage.

5. A circuit as claimed in claim 1 in which the second DC biasing circuit comprises a resistance voltage divider network connected between the emitter of the transistor and the first input terminal, the output of the voltage divider network being connected to the gate of the controlled rectifier element via a diode connected in series with a resistor, and another resistor being connected between said gate and the first input terminal.

6. A circuit as claimed in claim 1 in which the first biasing circuit comprises a resistance voltage divider network connected across the first and second input terminals, the output of the last mentioned network being connected to a diode which in turn is connected to the emitter of the transistor via a smoothing and voltage stabilizing circuit.

7. A circuit as claimed in claim 1 in which the discharge tube is connected in series with a resistor, said series connection being connected across the first and second output terminals.

8. A circuit as claimed in claim 1 in which the photoelectric cell is a photoconductive cell connected in series with a resistor between the base of the transistor and the first input terminal.

9. A circuit as claimed in claim 1 in which the controlled rectifier element is a silicon controlled rectifier.

References Cited

UNITED STATES PATENTS

| | | | |
|---|---|---|---|
| 3,177,421 | 4/1965 | Montgomery | 321—15 |
| 3,290,580 | 12/1966 | Wolff | 321—15 |
| 3,348,131 | 10/1967 | Banks. | |
| 3,358,217 | 12/1967 | Deelman | 323—21 |
| 3,431,464 | 3/1969 | Brischnik | 315—158 |

LEE T. HIX, Primary Examiner

G. GOLDBERG, Assistant Examiner

U.S. Cl. X.R.

250—214; 307—311; 315—158, 159; 323—21